United States Patent
Hirata

(10) Patent No.: US 8,034,496 B2
(45) Date of Patent: Oct. 11, 2011

(54) FUEL CELL

(75) Inventor: Katsuya Hirata, Ibaraki (JP)

(73) Assignees: Mitsubishi Materials Corporation, Tokyo (JP); The Kansai Electric Power Co., Inc., Osaka (JP)

(*) Notice: Subject to any disclaimer, the term of this patent is extended or adjusted under 35 U.S.C. 154(b) by 672 days.

(21) Appl. No.: 12/084,480

(22) PCT Filed: Nov. 1, 2006

(86) PCT No.: PCT/JP2006/321865
§ 371 (c)(1),
(2), (4) Date: Oct. 8, 2008

(87) PCT Pub. No.: WO2007/052704
PCT Pub. Date: May 10, 2007

(65) Prior Publication Data
US 2009/0136813 A1    May 28, 2009

(30) Foreign Application Priority Data
Nov. 2, 2005   (JP) .................................. 2005-319627

(51) Int. Cl.
*H01M 8/06* (2006.01)
(52) U.S. Cl. .................... 429/423; 429/408; 429/416
(58) Field of Classification Search .................. 429/408, 429/416, 423
See application file for complete search history.

(56) References Cited

U.S. PATENT DOCUMENTS

| | | | |
|---|---|---|---|
| 4,877,693 A | 10/1989 | Baker | |
| 4,983,471 A | 1/1991 | Reichner et al. | |
| 5,079,105 A | 1/1992 | Bossel | |
| 5,212,022 A * | 5/1993 | Takahashi et al. | 429/423 |
| 5,725,964 A | 3/1998 | Huppmann | |
| 6,200,696 B1 * | 3/2001 | Farooque et al. | 429/425 |
| 2004/0146773 A1 * | 7/2004 | Doshi et al. | 429/39 |
| 2005/0244684 A1 * | 11/2005 | Koripella | 429/20 |

FOREIGN PATENT DOCUMENTS

| | | |
|---|---|---|
| JP | 62-154578 | 7/1987 |
| JP | 63-232275 | 9/1988 |
| JP | 3-40379 | 2/1991 |
| JP | 3-216966 | 9/1991 |
| JP | 7-272741 | 10/1995 |
| JP | 8-213041 | 8/1996 |
| JP | 2005-19034 | 1/2005 |

OTHER PUBLICATIONS

International Search Report issued Feb. 27, 2007 in International (PCT) Application No. PCT/JP2006/321865.

* cited by examiner

*Primary Examiner* — Patrick Ryan
*Assistant Examiner* — Muhammad Siddiquee
(74) *Attorney, Agent, or Firm* — Wenderoth, Lind & Ponack, L.L.P.

(57) ABSTRACT

The present invention provides a highly efficient fuel cell having a fuel reformer which can efficiently recover the exhaust heat from fuel cell stacks and can realize high conversion. In a fuel cell (1), a large number of power generating cells (7) are laminated to constitute a fuel cell stack (3). At least four fuel cell stacks (3) are squarely-arranged in a plane direction in a housing (2). A fuel reformer (30) filled with a reforming catalyst (33) is arranged in a cross shape in between the mutually facing sides of the fuel cell stacks (3).

5 Claims, 2 Drawing Sheets

Raw fuel gas | Steam | Air

FUEL CELL

TECHNICAL FIELD

The present invention relates to an internal reforming fuel cell, in particular, a fuel cell in which the power generation efficiency is improved by reforming fuel at a high conversion rate.

BACKGROUND ART

When a hydrocarbon fuel gas such as town gas is used as a reaction gas to be introduced into a fuel cell, a fuel reformer is required to reform such a hydrocarbon gas (raw fuel gas) into a hydrogen rich gas.

In the fuel reformer, steam is mixed with the raw fuel gas to yield a mixed gas, and thereafter hydrogen is generated, for example, by allowing these two gases to react with each other in a high-temperature environment set at 350° C. or higher.

Specifically, in the reforming reaction (steam reforming), first, methane as the raw fuel gas and steam are allowed to react with each other to yield hydrogen and carbon monoxide, and further, the carbon monoxide thus generated and steam react with each other to yield hydrogen along with carbon dioxide.

These reactions are represented in terms of reaction formulas as follows:

$$CH_4 + H_2O \rightarrow H_2 + CO$$

$$CO + H_2O \rightarrow 3H_2 + CO_2$$

The above-described reforming reaction is an endothermic reaction, and for the purpose of performing a reforming reaction with such a satisfactory conversion rate that the residual amount of methane is 1% or less, it is necessary to heat a reforming catalyst in a fuel reformer at least to 640° C., and preferably to 700° C. or higher. Accordingly, an internal reforming fuel cell is designed in such a way that the thermal energy required for the reforming reaction is obtained from the high temperature exhaust gas discharged from a fuel cell stack (see, for example, Patent Document 1).

Incidentally, for example, in a solid oxide fuel cell, when it is a high-temperature operation type operated at temperatures in the vicinity of 1000° C., it is relatively easy to recover the thermal energy required for fuel reforming; however, when it is a low-temperature operation type operated at temperatures in the vicinity of 700° C., it becomes difficult to sufficiently recover the heat required for the endothermic reaction because the discharged thermal energy is smaller than that in the aforementioned high-temperature operation type. When sufficient energy is not supplied to the fuel reformer, the reforming reaction becomes insufficient, leading to a fear that no hydrogen rich reformed gas is obtained.

When a large amount of methane is contained in the reformed gas due to insufficient reforming, the carbon in the reformed gas is deposited in the power generating cells to drastically degrade the cell performance, and it interferes with efficient power generation.

Patent Document 1: Japanese Patent Laid-Open No. 2005-19034

DISCLOSURE OF THE INVENTION

The present invention was achieved in view of such problems as described above. An object of the present invention is to provide a highly efficient fuel cell having a fuel reformer which can efficiently recover the exhaust heat from fuel cell stacks and can realize high conversion.

For the purpose of achieving the above-described object, according to the present invention, there is provided a fuel cell comprising a plurality of fuel cell stacks placed in a housing, each fuel cell stack being formed by laminating a large number of power generating cells, wherein at least four fuel cell stacks are squarely-arranged (arranged in a square grid pattern) in a plane direction in the housing, and wherein a fuel reformer filled with a reforming catalyst is arranged in a cross shape in between the mutually facing sides of the fuel cell stacks.

In the above-described fuel cell, the fuel reformer is preferably formed in a cross shape capable of fitting in between the mutually facing sides of the fuel cell stacks.

Additionally, the above-described fuel cell can be configured in such a way that a first buffer zone in which no reforming catalyst is filled is provided in the gas inlet portion in the fuel reformer, and a second buffer zone in which no reforming catalyst is filled is provided in the gas outlet portion in the fuel reformer.

The present invention can be applied to a solid oxide fuel cell having a sealless structure which discharges a residual gas having not been used in the power generation reaction from the peripheral portion of each of the power generating cells.

According to the present invention, the fuel reformer is disposed in a central portion of the housing, the central portion being surrounded by the plurality of fuel cell stacks so as to be an accumulation area of radiated heat. Consequently, the fuel reformer effectively receives the heat radiated from the sides, facing to the reformer, of each of the stacks, to carry out fuel reforming at a sufficiently high reforming temperature at a high conversion rate; thus a hydrogen-rich reformed gas extremely low in the residual methane content can be obtained to thereby enable highly efficient power generation.

Additionally, by providing the first buffer zone in the gas inlet portion in the fuel reformer, a mixed gas (for example, a mixed gas composed of town gas and steam) introduced from the gas inlet is made to diffuse in fully spreading manner in the first buffer zone so as to be evenly and uniformly supplied to the interior (to the interior of the catalyst layer) of each section of the cross-shaped reformer, and hence the whole reforming catalyst in the reformer is effectively applied to enable efficient reforming to be carried out.

Additionally, by providing the second buffer zone in the gas outlet portion in the fuel reformer, the fuel cell stacks are prevented from unnecessary cooling caused by the cooling effect due to the endothermic reaction; and the reformed gas generated in each section of the cross-shaped reformer is received in the second buffer zone, thus the reformed gas is evenly supplied to each of the fuel cell stacks, and accordingly, well-balanced power generation is carried out in between the fuel cell stacks.

DESCRIPTION OF SYMBOLS

Figure 1:
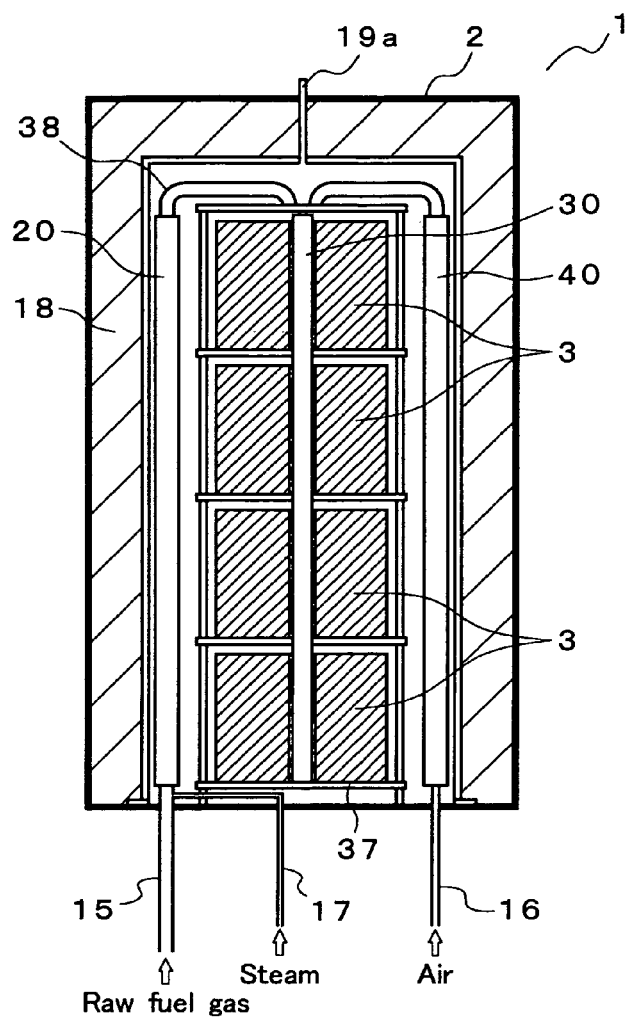
FIG. 1 is a sectional view illustrating the internal structure of a solid oxide fuel cell according to the present invention.

1 Fuel cell (solid oxide fuel cell)
2 Housing
3 Fuel cell stack
7 Power generating cell
30 Fuel reformer
31 Gas inlet
32 First buffer zone
33 Reforming catalyst
34 Gas outlet
35 Second buffer zone

BEST MODE FOR CARRYING OUT THE INVENTION

Hereinafter, an embodiment of the present invention is described with reference to FIGS. 1 to 4.

Figure 2:
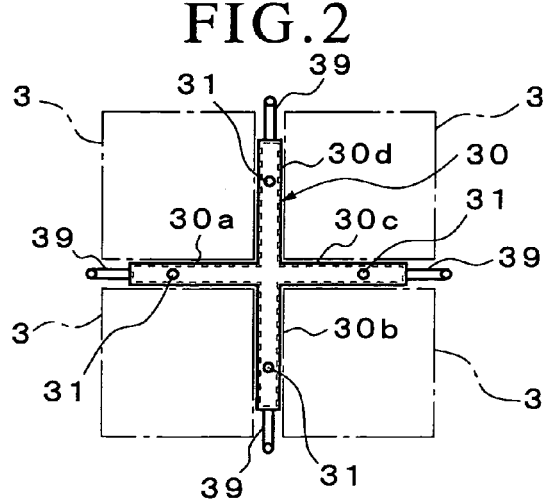
FIG. 2 is a top view of a fuel reformer according to the present invention.
Figure 3:
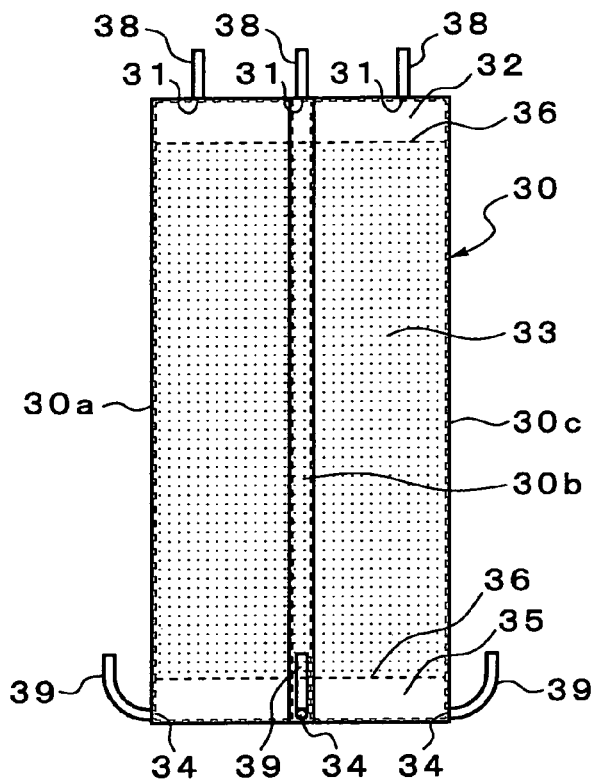
FIG. 3 is a side view of the fuel reformer according to the present invention.
Figure 4:
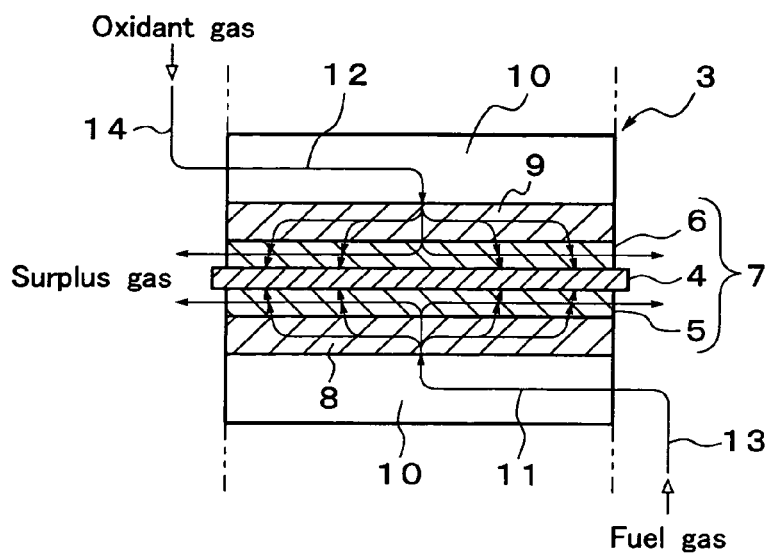
FIG. 4 is a schematic view illustrating the configuration of a main part of a fuel cell stack according to the present invention, with the illustrated gas flow at the time of operation.

FIG. 1 shows the internal structure of a solid oxide fuel cell to which the present invention is applied, FIG. 2 shows a plan view of a fuel reformer according to the present invention, FIG. 3 shows a side view of the fuel reformer, and FIG. 4 shows the configuration of a main part of a fuel cell stack.

In FIG. 1, reference numeral 1 denotes a solid oxide fuel cell, reference numeral 2 denotes a housing (can) in which the inner wall thereof is attached and covered with a heat insulating material 18, reference numeral 3 denotes a fuel cell stack disposed inside the housing 2 so as for the lamination direction to be vertical. In the present embodiment, the solid oxide fuel cell 1 is a high-power fuel cell (fuel cell module) in which four fuel cell stacks are squarely-arranged in a plane direction in the housing 2 (on a circle with the center thereof located at the center of the housing 2), and further four tiers of fuel cell stacks are disposed in the heightwise direction, and thus sixteen fuel cell stacks 3 in total are assembled and disposed.

As shown in FIG. 4, the above-described fuel cell stack 3 has a structure in which a power generating cell 7 including a fuel electrode layer 5 disposed on one side of a solid electrolyte layer 4 and an air electrode layer (oxidant electrode layer) 6 disposed on the other side of the solid electrolyte layer 4, a fuel electrode current collector 8 outside the fuel electrode layer 5, an air electrode current collector (oxidant electrode current collector) 9 outside the air electrode layer 6, and separators 10 respectively disposed outside the current collectors 8 and 9 are sequentially laminated in this order, and this lamination is repeated so that the structure has a large lamination number.

The solid electrolyte layer 4 is formed of a stabilized zirconia doped with yttria (YSZ) or the like. The fuel electrode layer 5 is formed of a metal such as Ni or a cermet such as Ni—YSZ. The air electrode layer 6 is formed of $LaMnO_3$, $LaCoO_3$ or the like. The fuel electrode current collector 8 is formed of a spongy porous sintered metallic plate made of Ni or the like. The air electrode current collector 9 is formed of a spongy porous sintered metallic plate made of Ag or the like. The separator 10 is formed of stainless steel or the like.

The separator 10 has a function of electrically connecting the power generating cells 7, and of supplying the reaction gases to the power generating cells 7, and is provided with a fuel gas passage 11 which introduces the fuel gas, supplied from the fuel gas manifold 13, from the outer peripheral surface of the separator 10 and discharges the fuel gas from a nearly central portion of the separator 10 facing the fuel electrode current collector 8 and with an oxidant gas passage 12 which introduces the oxidant gas, supplied from an oxidant gas manifold 14, from the outer peripheral surface of the separator 10 and discharges the oxidant gas from a nearly central portion of the separator 10 facing the air electrode current collector 9.

The solid oxide fuel cell 1 has a sealless structure in which no gas leakage preventing seal is provided in the peripheral portion of the power generating cell 7. At the time of operation, as shown in FIG. 4, the fuel gas and the oxidant gas (air) discharged toward the power generating cell 7 from the nearly central portion of the separator 10, respectively, through the fuel gas passage 11 and the oxidant gas passage 12, are supplied in a uniform distribution to the whole area of the fuel electrode layer 5 and to the whole area of the air electrode layer 6 while the fuel gas and the oxidant gas are being made to diffuse toward the peripheral portion of the power generating cell 7 so as to allow the power generating reaction to take place; and the residual gas (exhaust gas) remaining unconsumed in the power generating reaction is freely discharged to the outside from the peripheral portion of the power generating cell 7. Additionally, as shown in FIG. 1, an exhaust gas pipe 19a is provided in the top portion of the housing 2 for the purpose of discharging to the outside the high-temperature exhaust gas having been discharged into the internal space of the housing 2.

Additionally, in the housing 2, in addition to the above-described sixteen fuel cell stacks 3, a fuel heat exchanger 20, the fuel reformer 30 subsequent to the fuel heat exchanger 20 (located downstream of the fuel heat exchanger 20), an air heat exchanger 40 for preheating air and the like are disposed. A fuel gas supply pipe 15 and a water supply pipe 17 are connected to the fuel heat exchanger 20, and an oxidant gas supply pipe 16 is connected to the air heat exchanger 40. The heat exchangers 20 and 40 and the fuel reformer 30 are respectively disposed in appropriate positions in the vicinity of the fuel cell stacks 3 such that these heat exchangers 20 and 40 and the fuel reformer 30 can obtain sufficient heat conductance and sufficient radiation heat from the fuel cell stacks 3, so that efficient heat recovery is considered to be achieved in the housing 2.

In this connection, as has already been described, as a technique to improve the power generation efficiency of the fuel cell 1, it is effective to increase the conversion rate by increasing the reforming temperature in the above-described reformer 30.

Accordingly, in the present embodiment, the fuel reformer 30 is formed in a cross shape employing integrated structure, and is disposed as shown in FIG. 2 so as to make use of the gap between the mutually facing sides of the fuel cell stacks 3 squarely-arranged on a circle with the center thereof located at the center of the housing 2, in such a way that the fuel reformer 30 is mounted and fixed on a stack mounting base 37 disposed on the bottom of the housing 2 so that the fuel reformer 30 shares the same mounting plane with the plurality of fuel cell stacks 3.

In this fuel reformer 30, a gas inlet 31 is provided at the upper end of each of flat box-shaped wing sections 30a, 30b, 30c and 30d, a gas outlet 34 is provided at the lower end of each of the wing sections 30a, 30b, 30c and 30d, each of the gas inlets 31 at the upper end is connected to the above-described fuel heat exchanger 20 through the intermediary of an upper pipe 38, and each of the gas outlets 34 at the lower end is connected to the fuel gas manifold 13 shown in FIG. 4 through the intermediary of a lower pipe 39.

As shown in FIG. 3, although a reforming catalyst 33 is filled in the interior of the fuel reformer 30, spatial zones (the first buffer zone 32 and the second buffer zone 35) in each of which no reforming catalyst 33 is filled are provided in the gas inlet portion (the upper portion) of the reformer and the gas outlet portion (the lower portion) of the reformer, respectively. The zone filled with the reforming catalyst 33 and the upper and lower non-filled zones (namely, the buffer zones 32 and 35) are partitioned with punching plates 36 having air permeability, and the reforming catalyst 33 is filled in the zone partitioned and formed with the punching plates 36.

Examples usable as the reforming catalyst 33 include a pellet catalyst in which a Ni-based or Ru-based hydrocarbon catalyst is attached as the active component to the surface of a granular carrier and a honeycomb catalyst in which a catalyst itself is made to take a honeycomb structure.

In the above-described configuration, at the time of operation, a mixed gas composed of a hydrocarbon gas (for example, town gas) as the raw fuel gas and steam is preheated in the fuel heat exchanger 20 to be converted into a high temperature mixed gas, which is guided to the fuel reformer 30 through the upper pipe 38 and introduced into the reformer 30 from the gas inlet 31 of each of the wing sections 30a to 30d. The introduced gas is brought into contact with the reforming catalyst 33 in the respective wing sections 30a to 30d to allow the steam reforming reaction of the hydrocarbon gas to take place. This reforming reaction is an endothermic reaction, and the heat (650 to 800° C.) required for the reforming reaction is obtained by recovering the exhaust heat from the fuel cell stacks 3.

The reformed gas obtained by the reforming reaction conducted in the fuel reformer 30 is introduced from each of the gas outlets 34 located downstream of the fuel reformer 30 to the fuel gas manifold 13 of each of the fuel cell stacks 3 through each of the lower pipes 39. The reaction gas flows in each of the fuel cell stacks 3 are as illustrated in FIG. 4.

In the present embodiment, the fuel reformer 30 is disposed in a central portion of the housing 2, the central portion being surrounded by at least four fuel cell stacks 3 disposed in a plane direction, so as to be an accumulation area of the radiated heat from the fuel cell stacks 3. Consequently, in this heat accumulation area, the fuel reformer 30 effectively receives the heat radiated from the sides, facing to the reformer, of each of the stacks, so as to recover a sufficient reforming temperature and to thereby carry out fuel reforming at a high conversion rate; thus a hydrogen-rich reformed gas extremely low in the residual methane content can be obtained and supplied to the power generating cells 7, and hence a highly efficient power generation is enabled.

In particular, in the solid oxide fuel cell 1 having a sealless structure, high temperature exhaust gas is freely discharged from the sides of the fuel cell stacks 3 into the interior of the housing 2 so as to extremely facilitate the exhaust heat recovery, and accordingly, the outlet temperature of the fuel reformer 30 (reforming catalyst 33) can be ensured to be high enough to enable stable reforming, namely, to be 650° C. or higher, and hence the content of the residual methane can be actually made to be and maintained at 1% or less.

Additionally, by providing the first buffer zone 32 in the gas inlet 31 portion in the upper portion of the fuel reformer 30, a mixed gas introduced from the gas inlets 31 is made to diffusely spread throughout the first buffer zone 32 so as to be evenly and uniformly supplied to the reforming catalyst 33 in the interior of each of the cross-shaped wing sections 30a to 30d, and hence the whole reforming catalyst in the reformer is effectively utilized to enable efficient reforming to be carried out.

Additionally, by providing the second buffer zone 35 in the gas outlet 34 portion in the lower portion of the fuel reformer 30, this spatial zone suppresses the heat conduction to the stack mounting base 37, accordingly the fuel cell stacks 3 are prevented from unnecessary cooling, from the bottoms of the fuel cell stacks 3 through the stack mounting base 37, caused by the cooling effect during the endothermic reaction; and the reformed gas generated in each of the wing sections 30a to 30d is received in the second buffer zone to be thereafter distributed to and introduced into each of the lower pipes 39, thus the reformed gas is evenly supplied to each of the fuel cell stacks 3, through the lower pipes 39, and accordingly, well-balanced power generation is carried out in between the fuel cell stacks 3.

As described above, in the present embodiment, the fuel reformer 30 is made to be a cross shape so that it can fit in between the mutually facing sides of the fuel cell stacks 3. However, a configuration in which a flat box-shaped fuel reformer is disposed in between each of the pairs of mutually facing sides of the stacks may also be adopted.

Additionally, as for the fuel cell 1, description has been made on the configuration in which four fuel cell stacks 3 are arranged in a plane direction and each of which is vertically-stacked in four tiers; however, needless to say, the number of tiers is not limited to the above-mentioned value. What matters is that the structure of the fuel cell is only required to be a structure in which the above-described fuel reformer 30 is disposed in the central portion surrounded by the fuel cell stacks 3, where radiated heat from the stacks 3 accumulates.

INDUSTRIAL APPLICABILITY

As described above, according to the present invention, a highly efficient fuel cell having a high conversion rate fuel reformer capable of efficiently recovering the exhaust heat from fuel cell stacks can be provided.

The invention claimed is:

1. A fuel cell comprising a plurality of fuel cell stacks placed in a housing, each fuel cell stack being formed by laminating a large number of power generating cells, wherein:
   at least four fuel cell stacks are squarely-arranged in a plane direction in the housing; and
   a fuel reformer filled with a reforming catalyst is arranged in a cross shape in between the mutually facing sides of the fuel cell stacks.

2. The fuel cell according to claim 1, wherein the fuel reformer is formed in a cross shape capable of fitting in between the mutually facing sides of the fuel cell stacks.

3. The fuel cell according to claim 2, wherein a first buffer zone in which no reforming catalyst is filled is provided in a gas inlet portion in the fuel reformer.

4. The fuel cell according to claim 2, wherein a second buffer zone in which no reforming catalyst is filled is provided in a gas outlet portion in the fuel reformer.

5. The fuel cell according to claim 1, wherein the fuel cell is a solid oxide fuel cell having a sealless structure which discharges a residual gas having not been used in a power generation reaction from the outer peripheral portion of each of the power generating cells.

\* \* \* \* \*